(12) United States Patent
Clark et al.

(10) Patent No.: US 7,127,507 B1
(45) Date of Patent: Oct. 24, 2006

(54) METHOD AND APPARATUS FOR NETWORK-LEVEL MONITORING OF QUEUE-BASED MESSAGING SYSTEMS

(75) Inventors: Douglas W. Clark, Southlake, TX (US); Richard Hathaway, Denton, TX (US)

(73) Assignee: Sprint Communications Company L.P., Overland Park, KS (US)

( * ) Notice: Subject to any disclaimer, the term of this patent is extended or adjusted under 35 U.S.C. 154(b) by 879 days.

(21) Appl. No.: 09/965,255

(22) Filed: Sep. 27, 2001

(51) Int. Cl.
*G06F 15/173* (2006.01)

(52) U.S. Cl. .................. 709/224; 714/47; 715/736; 719/314

(58) Field of Classification Search ............ 707/10, 707/101; 709/201, 213, 202, 224; 717/127; 719/313, 314; 705/43; 370/356; 710/54
See application file for complete search history.

(56) References Cited

U.S. PATENT DOCUMENTS

| | | | | |
|---|---|---|---|---|
| 5,634,127 | A * | 5/1997 | Cloud et al. ............. | 719/313 |
| 5,675,798 | A * | 10/1997 | Chang ..................... | 709/224 |
| 6,023,722 | A * | 2/2000 | Colyer .................... | 709/201 |
| 6,434,605 | B1 * | 8/2002 | Faulkner et al. ......... | 709/213 |
| 6,615,215 | B1 * | 9/2003 | Petty ....................... | 707/101 |
| 6,760,911 | B1 * | 7/2004 | Ye ........................... | 719/314 |
| 6,817,010 | B1 * | 11/2004 | Aizenbud-Reshef et al. | 717/127 |
| 6,862,595 | B1 * | 3/2005 | Elko et al. ............... | 707/10 |
| 6,882,641 | B1 * | 4/2005 | Gallick et al. ............ | 370/356 |
| 6,889,244 | B1 * | 5/2005 | Gaither et al. ........... | 709/202 |
| 2002/0123966 | A1 * | 9/2002 | Chu et al. ................ | 705/43 |
| 2003/0050956 | A1 * | 3/2003 | Janssen et al. ........... | 709/201 |

* cited by examiner

*Primary Examiner*—John Follansbee
*Assistant Examiner*—Dustin Nguyen (57) ABSTRACT

A distributed computing environment and associated method for monitoring a queue-based messaging system. The queue-based messaging system controls the exchange of messages between a server process and client process applications. A messaging application residing at the server computer platform and forming part of the queue-based messaging system manages a plurality of trigger-initiated local queues, each associated with one of the plurality of client process applications and having queue depth, trigger enable, get enable and put enable attributes. A monitoring tool residing on the server computer platform acquires a value for the queue depth, trigger enable, put enable and get enable attributes for a plurality of trigger-initiated local queues and generally simultaneously displays, on a user interface coupled to the server computer platform, the value for the queue depth, trigger enable, put enable and get enable attributes for each one of the plurality of trigger-initiated local queues.

19 Claims, 3 Drawing Sheets

METHOD AND APPARATUS FOR NETWORK-LEVEL MONITORING OF QUEUE-BASED MESSAGING SYSTEMS

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The invention is directed to a method and apparatus for network-level monitoring of queue-based messaging systems used to exchange messages between computer platforms of a network. By monitoring plural specified queue attributes for plural specified queues at a selected computer platform, messaging failures for plural computer platforms engaged in message exchange with the selected computing platform may be readily detected and appropriate corrective action initiated.

BACKGROUND OF THE INVENTION

In a computer network, plural computer systems are joined together to exchange information and share resources. Thus, a computer network is a distributed computing environment in which networked computer systems provide users with the capabilities of access to distributed resources, for example, remote files and databases or remote printers, and to distributed processing, for example, where an application is processed on two or more computer systems. In such a distributed computing environment, the components of an application may reside on different machines but work together. For example, each work station in a computer network often provides a user interface and local analysis and data processing, while larger, host computers, for example, a file server or mainframe, may maintain a large set of data files, coordinate access to large databases and perform larger scale data processing.

In a distributed processing environment, each application or process must be able to communicate and exchange information with other applications or processes in the environment. Currently, many inter-application or inter-process exchanges are performed using a messaging technique commonly referred to as message queuing. In message queuing, a first (or "client") process passes a message to request processing by a second (or "server") process. The messages are queued at the server process to await handling thereby. In turn, the server process returns an alert when the results are ready. A message queuing messaging technique may be further characterized as being a "trigger initialized" messaging technique if a notification is issued to the server process upon placement of the request message in the message queue and the message queue meets certain specified criteria. One message oriented middleware product which uses a trigger initialized message queuing messaging technique to enable processes to communicate and exchange information in a distributed computing environment is known as MQ Series messaging software and is commercially available through International Business Machines Corporation of Armonk, N.Y.

A drawback to trigger initialized message queuing messaging techniques such as that disclosed in the MQ Series messaging software is that, if a message is already waiting in a queue when a new message arrives, the trigger flag is not set or otherwise checked when the new message arrives. As a result, if an error occurred during the arrival of a prior message and the trigger flag was not set upon the arrival of the prior message, then all later arriving messages will begin to back up in the queue because the trigger flag remains unset. As a result, both the original message as well as the later arriving messages will not be retrieved by the server process and the requesting messages issued by the client process will remain unprocessed.

A traditional technique used to identify problems in queues is to select individual queues for testing. To test a selected queue, a network administrator constructs a message designed to pass through that queue. If the message fails to arrive in a specified period of time, then the network administrator can reasonably conclude that the selected queue is having problems. It should be readily appreciated that to diagnose problems in a queue-based messaging system by testing individual queues thereof would be a laborious and time consuming task, particularly if the queue-based messaging system has many queues. Accordingly, many queue-based messaging systems are equipped with an interface which enables the network administrator to review the queues themselves. Heretofore, however, the network administrator/message queue interface has not been properly designed to enable the network administrator to readily identify and rectify problems in the message queues. For example, while the MQ Series messaging software is equipped with a message queue interface ("MQI") through which a series of administrative functions may be executed, such administrative functions operate on a queue-level. Using the MQI, the network administrator is able to review the status of a selected queue but cannot simultaneously review the status of plural queues. Thus, if a problem develops at the serving platform due to a problem within one of the message queues maintained thereat, the network administrator must review the functioning of each queue to locate the problem queue. Furthermore, the administrative tools available to the network administrator through the MQI are not particularly well configured to diagnose problems within a queue. Oftentimes, upon selecting a queue for examination, the network administrator must parse through pages of information related to the selected queue before the administrator is able to determine whether the queue is functioning properly or improperly.

Accordingly, this invention provides a tool by which a network administrator may readily identify and rectify queuing problems within a queue-based messaging system used for the exchange of messages between client and server processes or computer platforms of a computer network by enabling the network administrator to review selected information regarding selected queues of the queue-based messaging system at the network-level.

SUMMARY OF THE INVENTION

In one embodiment, the present invention is directed to a distributed computing environment which includes a server computer platform, a plurality of client computer platforms coupled to the server computer platform, a queue-based messaging system for controlling the exchange of messages between a server process application residing on the server computer platform and a plurality of client process applications residing on respective ones of the plurality of client computer platforms and a system for monitoring the queue-based messaging system. A messaging application residing at the server computer platform manages a plurality of queues, each described by a plurality of attributes. The monitoring system selects at least two of the plurality of queues and at least two of the plurality of attributes describing one or more of the plurality of queues and generates a display which includes a current value for the selected attributes for each one of the selected queues described thereby.

In one aspect of this embodiment of the invention, each one of the plurality of queues is a local queue for receiving messages originating at a corresponding one of the plurality of client process applications and destined for the server process application. Alternately, a first one of the plurality of selected attributes may be common to all queues while a second one of the plurality of selected attributes may be unique to local queues or the first and second ones of the plurality of selected attributes may be unique to local queues. Variously, the second one of the plurality of selected attributes may be a depth attribute; the first one of the selected attributes may be a get attribute and the second one of the selected attributes may be a depth attribute; or the first one of the selected attributes may be a trigger attribute and the second one of the selected attributes may be a depth attribute. In further aspects of this embodiment of the invention, a third one of the plurality of selected attributes may be an attribute common to all queues or may be a get attribute common to all queues.

In another embodiment, the present invention is directed to a distributed computing environment which includes a server computer platform and at least five client computer platforms coupled to the server computer platform. A queue-based messaging system controls the exchange of messages between a server process residing on the server computer platform and client process applications respectively residing on each one of the at least five client computer platforms. A messaging application residing at the server computer platform and forming part of the queue-based messaging system manages at least five trigger-initiated local queues, each associated with one of the at least five client process applications and having a queue depth attribute. A monitoring tool residing on the server computer platform acquires a value for the queue depth attribute for each one of the at least five trigger-initiated local queues and generally simultaneously displays, on a user interface coupled to the server computer platform, the value for the queue depth attribute for each one of the at least five trigger-initiated local queues.

In one aspect of this embodiment of the invention, each one of the at least five trigger-initiated local queues has a trigger enable attribute. In this aspect, the monitoring tool acquires a value for the trigger enable attribute for each one of the at least five trigger-initiated local queues and generally simultaneously displays, on the user interface, the value for the queue depth attribute and the value for the trigger enable attribute for each one of the at least five trigger-initiated local queues. In another aspect of this embodiment of the invention, each one of the at least five trigger-initiated local queues has a get message enable attribute. In this aspect, the monitoring tool acquires a value for the get enable attribute for each one of the at least five trigger-initiated local queues and generally simultaneously displays on the user interface, the value for the queue depth attribute and the value for the get message enable attribute for each one of the at least five trigger-initiated local queues. In still another aspect of this embodiment of the invention, each one of the at least five trigger-initiated local queues has a put message enable attribute. In this aspect, the monitoring tool acquires a value for the put message enable attribute for each one of the at least five trigger-initiated local queues; and generally simultaneously displays, on the user interface, the value for the queue depth attribute and the value for the put message enable attribute for each one of the at least five trigger-initiated local queues. Finally, in still another aspect of this embodiment of the invention, each one of the at least five trigger-initiated local queues has a trigger enable attribute, a get message enable attribute and a put message enable attribute. In this aspect, the monitoring tool acquires a value for the trigger enable attribute, the get message enable attribute and the put message enable attribute for each one of the at least five trigger-initiated local queues and generally simultaneously displays, on the user interface, the value for the queue depth attribute, the value for the trigger enable attribute, the value for the get message enable attribute and the value for the put message enable attribute for each one of the at least five trigger-initiated local queues.

In another embodiment, the present invention is directed to a method for monitoring a queue-based messaging system which controls the transfer of messages between a plurality of client computer platforms and a server platform coupled to the plurality of client computer platforms. At least one attribute which describes each one of a plurality of queues residing at the server computer platform is selected and a value for each one of the at least one attribute is acquired from the server computer platform. The value for each one of the at least one attribute for all of the plurality of queues is then generally simultaneously displayed. In one aspect of this embodiment of the invention, the display of the value for each one of the at least one attribute for all of the plurality of queues is reviewed and corrective action to rectify messaging failures identified from the review of the display is initiated. In another aspect thereof, the display of the value for each one of the at least one attribute for all of the plurality of queues is refreshed and corrective action to rectify messaging failures identified from a comparison of the refreshed display to the display is initiated.

In still another embodiment, the present invention is directed to a computer program product which comprises a computer usable medium and computer readable program code, encoded in the computer usable medium, for generally simultaneously monitoring values for a first plurality of attributes for a second plurality of local queues for a queue-based messaging system. In one aspect of this embodiment of the invention, the computer readable program code further comprises first computer readable program code for acquiring, from the queue-based messaging system, the values for the first plurality of attributes for the second plurality of local queues and second computer readable code for generating a display containing all of the values acquired for the first plurality of attributes for the second plurality of local queues.

DETAILED DESCRIPTION OF THE INVENTION

Figure 1:
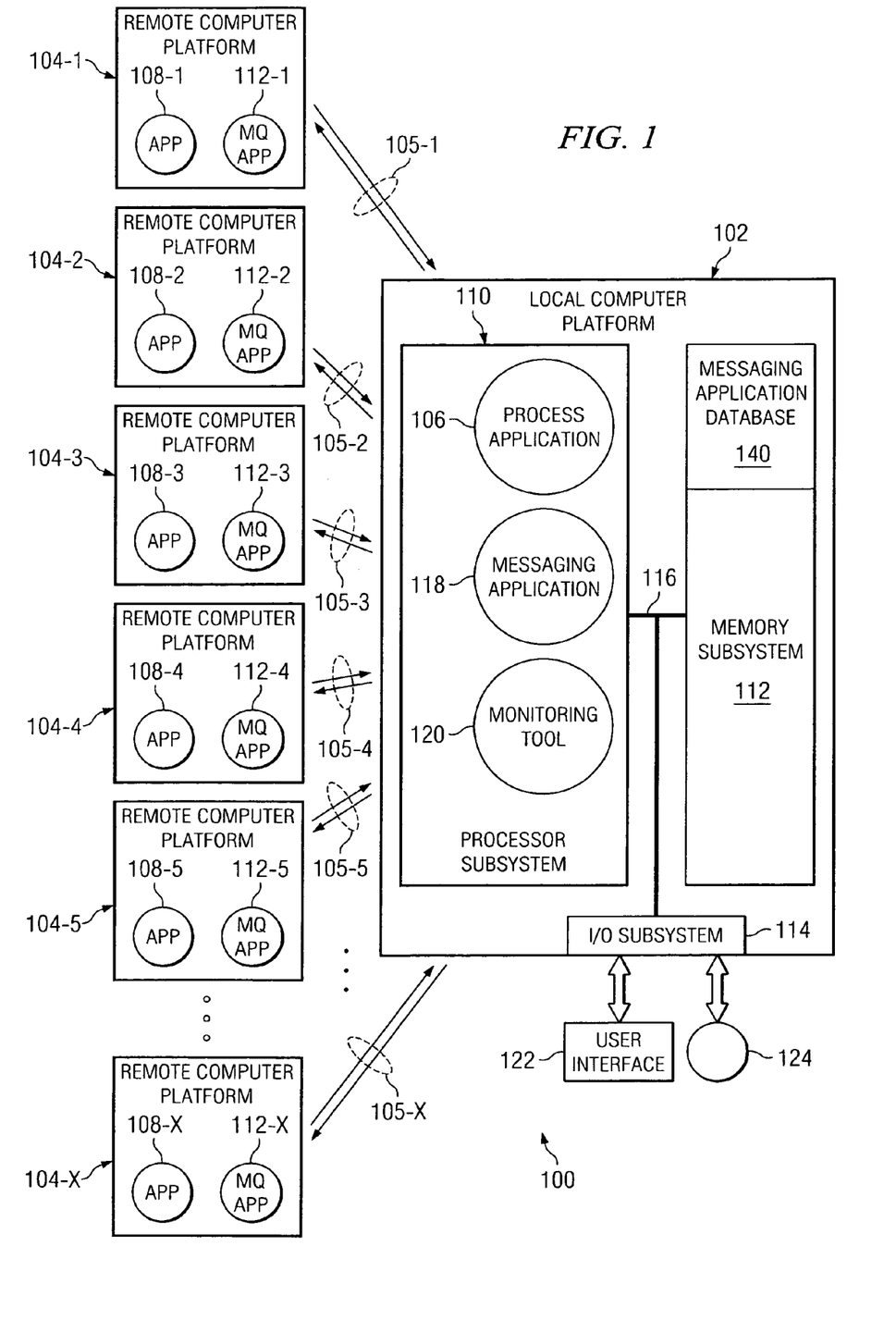
FIG. 1 is a block diagram of a distributed computing environment

Referring now to FIG. 1, a distributed computing environment 100, for example, a computer network, may now be seen. The distributed computing environment 100 is comprised of plural computer platforms 102 and 104-1 through 104-X coupled together by communication links 105-1 through 105-X. As will be more fully described below, the distributed computing environment uses a queue-based messaging system (not shown in FIG. 1) for the exchange of messages between the various computer platforms 102 and 104-1 through 104-X which collectively form the distributed computing environment. In the embodiment of the invention disclosed herein, the distributed computing environment is comprised of disparate computer platforms and the queue-based messaging system used to exchange messages between the disparate computer platforms is the aforementioned MQ Series messaging software which supports a wide variety of computer platforms and operating systems.

By way of example, the distributed computing environment 100 is arranged in a star topology in FIG. 1. It should be clearly understood, however, that other topologies, for example, a ring topology, would also be suitable for the uses contemplated herein. Further by way of example, the computer platform 102 is a mainframe system and the computer platforms 104-1 through 104-X are server systems. Again, it should be clearly understood that other computer platforms would be suitable for the uses contemplated herein. Finally, while not illustrated in FIG. 1, it is further contemplated that plural personal computers ("PCs") may be coupled to each server system 104-1 through 104-X. Within the distributed computing environment 100, the computer platform 102 is hereby designated as a local platform while the computer platforms 104-1 through 104-X are all designated as remote platforms. Of course, the designation of any particular computer platform as the "local" platform is purely arbitrary and it should be clearly understood that those computer platforms designated as "remote" platforms should be viewed simply being remote relative to the local computer platform.

The computer platform 102 is comprised of a processor subsystem 110, a memory subsystem 112 and an input/output ("I/O") subsystem 114 coupled together by a bus subsystem 116. As used herein, the terms "couple" or "coupled" refer broadly to either direct or indirect connection therebetween. The bus subsystem 116 encompasses the main system bus and any local or other types of busses that collectively couple the processor subsystem 110, the memory subsystem 112 and the I/O subsystem 114 to one another. The processor subsystem 110 encompasses the collective processing capability of the computer platform 102, including the central processing unit ("CPU") as well as any secondary processing devices, coupled to the CPU by the bus subsystem 116. Similarly, the memory subsystem 112 encompasses the collective storage capability of the computer platform 102, including main, auxiliary, cache and any other memory accessible by the processor subsystem 110 via the bus subsystem 116. Finally, the I/O subsystem 114 encompasses any and all I/O devices, for example, floppy, CD-ROM or DVD drives, coupled to the bus subsystem 116, for writing data to or reading data from the processor subsystem 110 or the memory subsystem 112. The I/O subsystem 114 also encompasses any data communications equipment ("DCE"), for example, network interface cards or modems, which couple the computing platform 102 to data terminal equipment ("DTE") such as the computer platforms 104-1 through 104-X via the communication links 105-1 through 105-X. Finally, the I/O subsystem 114 couples user interface 122 to the computer platform 102. The user interface 122 encompasses all devices used by a user, for example, a network administrator, to interact with the computer platform 102 while either obtaining information therefrom or providing data or instructions thereto. While a typical user interface 122 encompasses a monitor, keyboard, mouse and printer, it should be clearly understood that there are a wide variety of other devices which may also form part of the user interface 122.

As may be further seen in FIG. 1, first, second and third software applications 106, 118 and 120 reside on the computer platform 102. Each one of the first, second and third software applications 106, 118 and 120 is comprised of a series of instructions which are encoded in the memory subsystem 112 as computer readable program code and executable by the processor subsystem 110. Contained within the first application 106 is a server process for which one or more of the computer platforms 104-1 through 104-X may issue requests thereto in a manner to be more fully described below. It should be noted, of course, while FIG. 1 shows a single application containing a single server process it should be clearly understood that a single application may contain plural server processes and/or plural applications, each containing one or more server processes, may reside on the computer platform 102.

The second application 118 is a messaging application which enables messages received from a client process residing on a first computer platform, for example, the computer platform 104-2, to be directed to a server process residing on a second computer platform, here, the server process 106 residing on the computer platform 102. The messaging application 118 further enables replies from the server process residing on the second computer platform, here, the server process 106 residing on the second computer platform 102, to be returned to the first computer platform, for example, the computer platform 104-2. As will be more fully described below, the messaging application 118 manages a portion of the memory subsystem 112, hereafter referred to as messaging application database 140. Within the messaging application database 140, the messaging application 118 maintains plural message queues as well as control information which defines, among other items, the attributes of each queue maintained thereby. Commercially available software suitable for use as the messaging application 118 is IBM's MQ Series messaging software.

Finally, the third application 120 is a monitoring tool which, as will be more fully described below, enables a network administrator to monitor queue-based messaging between client processes residing at the computer platforms 104-1 through 104-X and server processes residing at the computer platform 102 at a network level. Typically, the monitoring tool 120 will be stored in an auxiliary memory (not shown) of the memory subsystem 112 prior to the execution thereof by the processor subsystem 110. A transportable computer usable medium 124, for example, a floppy disk, CD-ROM or file transfer software, is used to copy the monitoring tool 120 into the auxiliary memory of the memory subsystem 112.

Similarly, first and second software applications 108-1 through 108-X and 112-1 through 112-X reside on respective ones of the computer platforms 104-1 through 104-X. Each one of the first and second software applications 108-1 through 108-X and 112-1 through 112-X is comprised of a series of instructions which are encoded in a memory subsystem (not shown) as computer readable program code and executable by the processor subsystem (also not shown) of the respective computer platform 104-1 through 104-X. Contained within the first application 106 is a client process which may issue requests to the computer platform 102 in a manner to be more fully described below. It should be noted, of course, while FIG. 1 shows a single application containing a single client process residing on each of the computer platforms 104-1 through 104-X, it should be clearly understood that a single application residing on the computer platforms 104-1 through 104-X may contain plural client processes and/or plural applications, each containing one or more client processes, may reside on the computer platforms 104-1 through 104-X.

Each messaging application 112-1 through 112-X enables messages from a client process contained in the application 108-1 through 108-X residing at the computer platform 104-1 through 104-X to be directed to a second computer platform, for example, the computer platform 102. Each messaging application 112-1 through 112-X further enables replies from the server process residing on the second computer platform, here, the server process 106 residing on the computer platform 102, to be returned to the client process residing on the first platform, here, the computer platform 108-2. Commercially available software suitable for use as the messaging applications 112-1 through 112-X is IBM's MQ Series messaging software.

Figure 2:
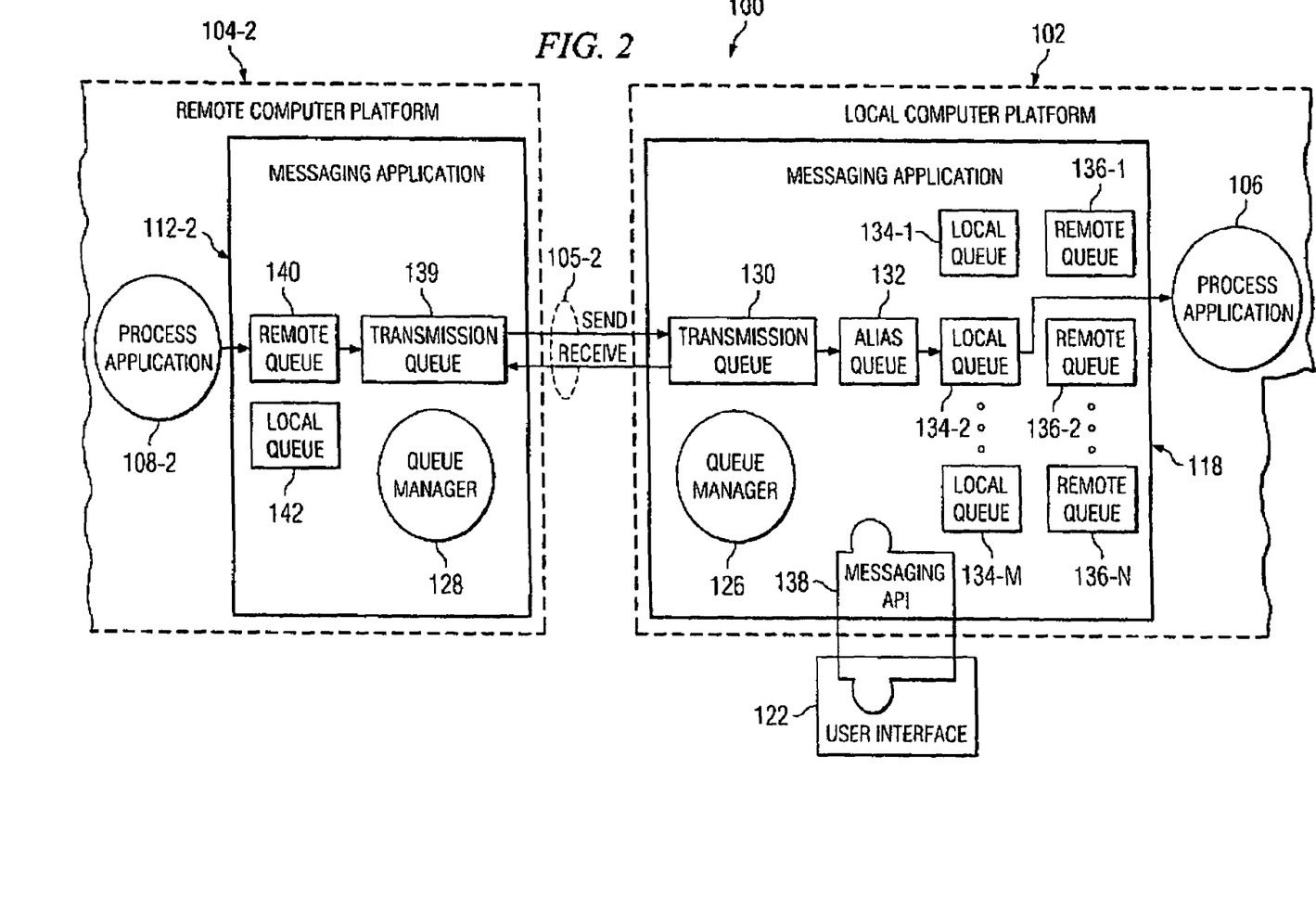
FIG. 2 is an expanded block diagram of selected portions of client and server platforms, including client and server messaging applications thereof, of the distributed computing environment of FIG. 1.

A queue-based messaging system is comprised of a messaging application which handles messages for a server process, for example, messaging application 118, and a messaging application which handles messages for a client process, for example, one or more of the messaging applications 112-1 through 112-X. Referring next to FIG. 2, the messaging application 118 residing on the local computer platform 102 which handles messages for the server process application 106 and the messaging application which handles messages for a client process application on a remote computer platform, for example, the messaging application 112-2 which handles messages for the client process application 108-2 residing on the remote computer platform 104-2 will now be described in greater detail. As may now be seen, a queue manager 126 resides on the messaging application 118 and a queue manager 128 resides on the messaging application 112-2. The queue managers 126 and 128 are system programs that provide queuing services to applications. For example, the queue manager 126 provides queuing services to the process application 106 while the queue manager 128 provides queuing services to the process application 108-2. The queue managers 126 and 128 further provide application programming interfaces so that the respective application processes 106 and 108-2 serviced thereby can put messages on, and get messages from, queues. Finally, the queue managers 126 and 128 provide additional functions so that administrators can create new queues, alter the properties of existing queues, and control the operation of the queue manager itself. It should be noted that, while FIG. 2 shows a single queue manager 126 and 128 running on the messaging applications 118 and 112-2, respectively, it should be clearly understood that plural queue managers may run on a single massaging application. For example, for the aforementioned MQ Series messaging software, plural queue managers may run on MVS, OS/2, Windows NT, Digital OpenVMS and UNIX systems. It should be further noted that while FIG. 2 shows a single process application 106 making use of the services of the queue manager 126, plural applications, whether related to one another or entirely unrelated to one another, may make use of the queue manager 126 at the same time.

FIG. 2 also shows plural queues residing on each of the messaging applications 118 and 112-2. In this regard, it should be noted that queues reside in, and are managed by, a queue manager and have been shown in FIG. 2 as being discrete relative to the queue manager merely for ease of illustration. Before using a queue, it must be open for a specified purpose. The purposes for which a queue may be opened include:

Browsing messages on a queue;
Retrieving messages from the queue;
Putting messages on the queue;
Inquiring about attributes of the queue; and
Setting the attributes of the queue.

Plural types of queues may reside in the queue managers 126 and 128. Generally, the queues residing in the queue managers 126 may be characterized as either local, remote or alias queues. A queue is deemed a local queue if it is owned by the queue manager to which the process application is connected. Conversely, a queue is deemed a remote queue if it is owned by a different queue manager. A queue definition object, created when a local queue is defined, will hold the definition information of the queue as well as the physical messages put on the queue. The queue definition object, created when a remote queue is defined, will only hold the information necessary for the local queue manager to be able to locate the queue where the message is to go to. This object is known as the local definition of a remote queue. All the attributes of the remote queue are held by the queue manager that owns it, because it is a local queue to that queue manager. Finally, an alias queue is used to access another queue. As a result, plural process applications may work with a single queue by accessing it with different names.

Residing in the queue manager 126 are a transmission queue 130, an alias queue 132, a plurality of local queues 134-1 through 134-M and a plurality of remote queues 136-1 through 136-N. Similarly, residing in the queue manager 128 are a transmission queue 139, a remote queue 140 and a local queue 142. The transmission queues 130 and 139 are local queues which hold messages destined for a remote queue. The messages held in the transmission queue are forwarded to their destination queue by the queue manager when a channel is available. The local queues 134-1 through 134-M and 142 are trigger-initiated local queues. When the queue manager places a message on a trigger-initiated local queue and certain conditions are met on that queue, a trigger message is automatically sent to the server process application 106 to notify the server process application 106 that a message has been placed on that queue. In turn, the server process application 106 will then retrieve the message from the trigger-initiated local queue. A condition commonly used for trigger-initiated local queues is that a trigger message will be issued to notify the server process application 106 that a message has been placed on the trigger-initiated local queue if there are no messages sitting in that queue when the message is placed in the queue. Finally, the queues 136-1 through 136-N and 140 are remote queues or, more precisely, local definitions of a remote queue where a message, when placed in the remote queue, is to be delivered. For example, the remote queue 136-2 holds the information necessary to deliver a message to the local queue 142.

Conversely, the remote queue 140 holds the information necessary to deliver a message to the local queue 134-2.

As may be noted from even a cursory review of FIG. 2, many more queues reside in the queue manager 126 than in the queue manager 128. This disparity is a result of the usage of the computer platforms 102 and 104-1 through 104-X of the distributed computing environment 100. As disclosed herein, the computer platform 102 is a mainframe computer system on which the server process application 106 residing thereat performs one or more processing tasks for each one of the client process applications 108-1 through 108-X respectively residing at the computer platforms 104-1 through 104-X. Thus, within the queue manager 126, the local queues 134-1 through 134-M include, at a minimum, a separate trigger-initiated local queue to receive messages from each one of the client process applications 108-1 through 108-X. However, the local queues 134-1 through 134-M may also include additional trigger-initiated local queues, for example, if one or more of the client process applications 108-1 through 108-X exchanges messages with a second server process application (not shown) residing at the computer platform 102. Similarly, as the server process application 106 residing at the computer platform 102 returns messages to each of the client process application 108-1 through 108-X respectively residing at the computer platforms 104-1 through 104-X, the remote queues 136-1 through 136-N include, at a minimum, a separate remote queue to receive messages, from the server process application 106, destined to each one of the client process applications 108-1 through 108-X. Again, however, the remote queues 136-1 through 136-N may also include additional remote queues, for example, if the server process application 106 also exchanges messages with a second client process application (not shown) residing at one or more of the computer platforms 104-1 through 104-X.

It should also be noted that there are a number of types of queues not specifically illustrated in FIG. 2 that may reside within the queue managers 126 or 128. Among them are a dead-letter queue, a system command queue, a system default queue, a channel queue, an event queue, model queues and dynamic queues. The dead-letter queue is a local queue on which the queue manager and applications put messages they cannot deliver. The system command queue is a queue to which suitably authorized applications can send system commands. System default queues are used to maintain default queue definitions. Channel queues are used for distributed queue management. Event queues hold event messages to be reported by the queue manager or a channel. A model queue is a template of a queue definition. Using the attributes of the model queue, the queue manager can dynamically create either a temporary dynamic or permanent dynamic local queue.

Continuing to refer to FIG. 2, the process by which a message is delivered from a client process, specifically, the process application 108-2, to a server process, specifically, the process application 106, will now be described in greater detail. The client process application 108-2 will first connect to the queue manager 128 so that the client process application 108-2 may request that the queue manager 128 open the remote queue 140 which contains a description of the destination of the message. Once the remote queue 140 is opened, the client process application 108-2 places the message in the remote queue 140. As previously set forth, the remote queue 140 contains that information necessary to direct the message to the local queue 134-2 where it may be retrieved by the server process application 106. The queue manager 128 then places the message onto the transmission queue 139 where it will be transmitted over the channel 105-2 to the transmission queue 130. Upon arriving at the transmission queue 130, the queue manager 126 will assume control of the message. From the transmission queue 130, the queue manager 126 will first direct the message to the alias queue 132 (if, as here, plural initiation queues are accessed through a single alias queue) and on to the trigger-initiated local queue 136-2. If there are no messages sitting in the trigger-initiated local queue 136-2 upon arrival of the message, the queue manager 126 will notify the server process application 106 of the arrival of the message. The server process application 106 will then connect to the queue manager 126 to request that the queue manager 126 open the trigger-initiated local queue 136-2 and, after the trigger-initiated local queue 136-2 has been opened, the server process application 106 retrieves the message from the trigger-initiated local queue 136-2.

As previously mentioned, a queue manager, for example, the queue manager 126 may perform various administrative functions such as creating new queues and altering the properties of existing queues. Additionally, the queue manager 126 may issue an inquiry regarding an attribute of an object. In MQ Series messaging software, an MQINQ call may be used to inquire as to the current value of one or more attributes of an object. Calls are made through a messaging application program interface ("messaging API") 138, for example, the message queue interface ("MQI") of the MQ series messaging software. An administrator may also use the messaging API 138 to issue a MQINQ call from the user interface 122 to obtain the current value of one or more attributes of an object.

Figure 3:
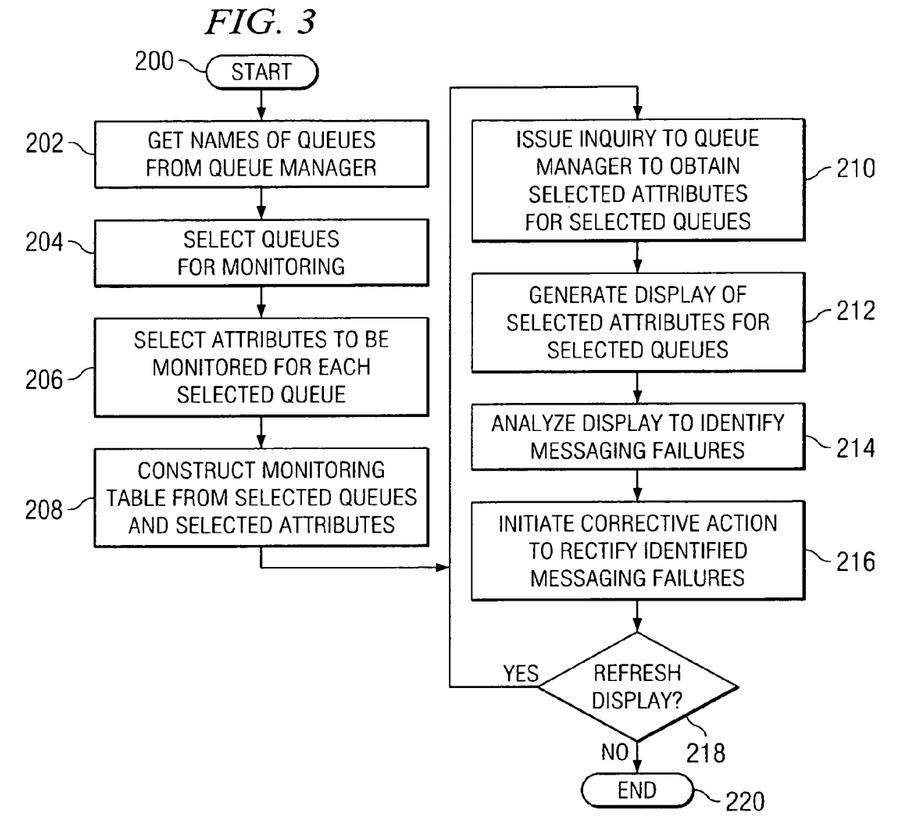
FIG. 3 is a flow chart of a method of network-level monitoring of a queue-based messaging system.

Referring next to FIG. 3, a method of monitoring a messaging system used to exchange messages between computing platforms of a computer network will now be described in greater detail. The method commences at step 200 and, at step 202, the messaging API 138 is used to request the queue manager 126 to retrieve, from the messaging application database 140, the names of the queues being managed thereby. For example, invoking an MQINQ call to a NAMELIST object in MVS/ESA would cause the MQ Series messaging software to retrieve the names of the queues being maintained by the queue manager 126. At step 204, those queues to be monitored are selected from the list of queues provided by invoking the MQINQ call to the NAMELIST object. Typically, the queue manager 126 would maintain plural remote and local queues, including local transmission, alias, and initiation queues, for the server computer platform 102. While any combination of these queues may be selected for monitoring, one suitable combination of queues to be selected for monitoring would be the local initiation queues 134-1 through 134-X corresponding to the client process application 108-1 through 108-X being served by a selected server process application 106 at the serving computer platform 102.

Proceeding on to step 206, plural attributes to be monitored for each of the selected local initiation queues 134-1 through 134-X are selected. Generally, an attribute describes a characteristic of a queue. While the attributes which are used to describe a queue may vary, for queues established using the MQ Series messaging software, the attributes set forth below are used to describe all queues.

DefPersistence (MQLONG)
Default message persistence.
This is the default persistence for messages on a queue.
This applies if MQPER_PERSISTENCE_AS_Q_DEF is specified in the message descriptor when the message is put.

If there is more than one definition in the queue-name resolution path, the default persistence is taken from the value of this attribute in the first definition in the path at the time of the put operation (even if this is a queue-manager alias).

The value is one of the following:

MQPER_PERSISTENT

Message is persistent.

The message survives restarts of the queue manager. Because temporary dynamic queues do not survive restarts of the queue manager, persistent messages cannot be put on temporary dynamic queues; persistent messages can however be put on permanent dynamic queues, and predefined queues.

MQPER_NOT_PERSISTENT

Message is not persistent.

The message does not survive restarts of the queue manager. This applies even if an intact copy of the message is found on auxiliary storage during the restart procedure.

Both persistent and nonpersistent messages can exist on the same queue.

To determine the value of this attribute, use the MQIA_DEF_PERSISTENCE selector with the MQINQ call.

DefPriority (MQLONG)

Default message priority

This is the default priority for messages on the queue. This applies if MQPRI_PRIORITY_AS_Q_DEF is specified in the message descriptor when the message is put on the queue.

If there is more than one definition in the queue-name resolution path, the default priority for the message is taken from the value of this attribute in the first definition in the path at the time of the put operation (even if this is a queue-manager alias).

The way in which a message is placed on a queue depends on the value of the queue's MsgDeliverySequence attribute:

If the MsgDeliverySequence attribute is MQMDS_PRIORITY, the logical position at which a message is placed on the queue is dependent on the value of the Priority field in the message descriptor.

If the MsgDeliverySequence attribute is MQMDS_FIFO, messages are placed on the queue as though they had a priority equal to the DefPriority of the resolved queue, regardless of the value of the Priority field in the message descriptor. However, the Priority field retains the value specified by the application that put the message.

Priorities are in the range zero (lowest) through MaxPriority (highest).

To determine the value of this attribute, use the MQIA_DEF_PRIORITY selector with the MQINQ call.

InhibitGet (MQLONG)

Controls whether get operations for this queue are allowed.

This attribute applies only to local, model, and alias queues.

If the queue is an alias queue, get operations must be allowed for both the alias and the base queue at the time of the get operation, in order for the MQGET call to succeed.

The value is one of the following:

MQQA_GET_INHIBITED

Get operations are inhibited.

MQGET calls fail with reason code MQRC_GET_INHIBITED. This includes MQGET calls that specify MQGMO_BROWSE_FIRST or MQGMO_BROWSE_NEXT.

MQQA_GET_ALLOWED

Get operations are allowed.

To determine the value of this attribute, use the MQIA_INHIBIT_GET selector with the MQINQ call. To change the value of this attribute, use the MQSET call.

InhibitPut (MQLONG)

Controls whether put operations for this queue are allowed.

If there is more than one definition in the queue-name resolution path, put operations must be allowed for every definition in the path (including any queue-manager alias definitions) at the time of the put operation, in order for the MQPUT or MQPUT1 call to succeed.

The value is one of the following:

MQQA_PUT_INHIBITED

Put operations are inhibited.

MQPUT and MQPUT1 calls fail with reason code MQRC_PUT_INHIBITED.

MQQA_PUT_ALLOWED

Put operations are allowed.

To determine the value of this attribute, use the MQIA_INHIBIT_PUT selector with the MQINQ call. To change the value of this attribute, use the MQSET call.

QDesc (MQCHAR64)

Queue description.

This is a field that may be used for descriptive commentary. The content of the field is of no significance to the queue manager, but the queue manager may require that the field contain only characters that can be displayed. It cannot contain any null characters; if necessary, it is padded to the right with blanks. In a DBCS installation, the field can contain DBCS characters (subject to a maximum field length of 64 bytes).

To determine the value of this attribute, use the MQCA_Q_DESC selector with the MQINQ call. The length of this attribute is given by MQ_Q_DESC_LENGTH.

QName (MQCHAR48)

Queue name.

This is the name of a queue defined on the local queue manager. All queues defined on a queue manager share the same queue name space. Therefore, a MQQT_LOCAL queue and a MQQT_ALIAS queue cannot have the same name.

To determine the value of this attribute, use the MQCA_Q_NAME selector with the MQINQ call. The length of this attribute is given by MQ_Q_NAME_LENGTH.

QType (MQLONG)

Queue type.

This attribute has one of the following values:

MQQT_ALIAS

Alias queue definition.

MQQT_LOCAL

Local queue.

MQQT_MODEL

Model queue definition.

MQQT_REMOTE

Local definition of a remote queue.

To determine the value of this attribute, use the MQIA_Q_TYPE selector with the MQINQ call.

Scope (MQLONG)

Controls whether an entry for this queue also exists in a cell directory.

A cell directory is provided by an installable Name service. This attribute applies only to local and alias queues, and to local definitions of remote queues. It does not apply to model queues.

The value is one of the following:

MQSCO_Q_MGR

Queue-manager scope.

The queue definition has queue-manager scope. This means that the definition of the queue does not extend beyond the queue manager which owns it. To open the queue for output from some other queue manager, either the name of the owning queue manager must be specified, or the other queue manager must have a local definition of the queue.

MQSCO_CELL

Cell scope.

The queue definition has cell scope. This means that the queue definition is also placed in a cell directory available to all of the queue managers in the cell. The queue can be opened for output from any of the queue managers in the cell merely by specifying the name of the queue; the name of the queue manager which owns the queue need not be specified. However, the cell definition is not available to any queue manager in the cell which also has a local definition of a queue with that name, as the local definition takes precedence.

A cell directory is provided by an installable Name service. For example, the DCE Name service inserts the queue definition into the DCE directory.

Model and dynamic queues cannot have cell scope.

This value is only valid if a name service supporting a cell directory has been configured.

To determine the value of this attribute, use the MQIA_SCOPE selector with the MQINQ call.

Support for this attribute is subject to the following restrictions:

On OS/400, the attribute is supported, but only MQSCO_Q_MGR is valid.

On MVS/ESA, 16-bit Windows, and 32-bit Windows, the attribute is not supported.

In addition to the attributes set forth above, local queues are described using a number of additional attributes. These additional attributes are set forth below.

BackoutRequeueQName (MQCHAR48)

Excessive backout requeue queue name.

Apart from allowing its value to be queried, the queue manager takes no action based on the value of this attribute.

To determine the value of this attribute, use the MQCA_BACKOUT_REQ_Q_NAME selector with the MQINQ call. The length of this attribute is given by MQ_QNAME_LENGTH.

BackoutThreshold (MQLONG)

Backout threshold.

Apart from allowing its value to be queried, the queue manager takes no action based on the value of this attribute.

To determine the value of this attribute, use the MQIA_BACKOUT_THRESHOLD selector with the MQINQ call.

CreationDate (MQCHAR12)

Date this queue was created.

The format is

YYYY-MM-DD with 2 bytes of blank padding to the right to make the length 12 bytes. For example: 1992-09-23bb is 23 Sep. 1992 ("bb" represents 2 blank characters).

On OS/400, the creation date of a queue may differ from that of the underlying operating system entity (file or userspace) that represents the queue.

To determine the value of this attribute, use the MQCA_CREATION_DATE selector with the MQINQ call. The length of this attribute is given by MQ_CREATION_DATE_LENGTH.

CreationTime (MQCHAR8)

Time this queue was created.

The format is

HH.MM.SS using the 24-hour clock, with a leading zero if the hour is less than 10. For example: 21.10.20 This is an 8-character string. The time is local time.

On MVS/ESA, the time is Greenwich Mean Time (GMT), subject to the system clock being set accurately to GMT.

On OS/400, the creation time of a queue may differ from that of the underlying operating system entity (file or userspace) that represents the queue.

To determine the value of this attribute, use the MQCA_CREATION_TIME selector with the MQINQ call. The length of this attribute is given by MQ_CREATION_TIME_LENGTH.

CurrentQDepth (MQLONG)

Current queue depth.

This is the number of messages currently on the queue. It is incremented during an MQPUT call, and during backout of an MQGET call. It is decremented during a nonbrowse MQGET call, and during backout of an MQPUT call. The effect of this is that the count includes messages that have been put on the queue within a unit of work, but which have not yet been committed, even though they are not eligible to be retrieved by the MQGET call. Similarly, it excludes messages that have been retrieved within a unit of work using the MQGET call, but which have yet to be committed.

The count also includes messages which have passed their expiry time but have not yet been discarded, although these messages are not eligible to be retrieved.

The value of this attribute fluctuates as the queue manager operates.

This attribute does not apply to model queues, but it does apply to the dynamically-defined queues created from the model queue definitions using the MQOPEN call.

To determine the value of this attribute, use the MQIA_CURRENT_Q_DEPTH selector with the MQINQ call.

DefinitionType (MQLONG)

Queue definition type.

This indicates how the queue was defined. It is one of the following:

MQQDT_PREDEFINED

Predefined permanent queue.

The queue is a permanent queue created by the system administrator; only the system administrator can delete it.

Predefined queues are created using the DEFINE command, and can be deleted only by using the DELETE command. Predefined queues cannot be created from model queues.

Commands can be issued either by an operator, or by an authorized application sending a command message to the command input queue.

MQQDT_PERMANENT_DYNAMIC

Dynamically defined permanent queue.

The queue is a permanent queue that was created by an application issuing an MQOPEN call with the name of a model queue specified in the object descriptor. The model queue definition has the value MQQDT_PERMANENT_DYNAMIC for the DefinitionType attribute. This type of queue can be deleted using the MQCLOSE call.

MQQDT_TEMPORARY_DYNAMIC

Dynamically defined temporary queue.

The queue is a temporary queue that was created by an application issuing an MQOPEN call with the name of a model queue specified in the object descriptor. The model queue definition has the value MQQDT_TEMPORARY_DYNAMIC for the DefinitionType attribute. This type of queue is deleted automatically by the MQCLOSE call when it is closed by the application that created it.

This attribute in a model queue definition does not indicate how the model queue was defined, because model queues are always predefined. Instead, the value of this attribute in the model queue is used to determine the DefinitionType of each of the dynamic queues created from the model queue definition using the MQOPEN call.

To determine the value of this attribute, use the MQIA_DEFINITION_TYPE selector with the MQINQ call.

DefInputOpenOption (MQLONG)

Default input open option.

This is the default way in which the queue should be opened for input. It applies if the MQOO_INPUT_AS_Q_DEF option is specified on the MQOPEN call when the queue is opened. It is one of the following:

MQOO_INPUT_EXCLUSIVE

Open queue to get messages with exclusive access.

The queue is opened for use with subsequent MQGET calls. The call fails with reason code MQRC_OBJECT_IN_USE if the queue is currently open by this or another application for input of any type (MQOO_INPUT_SHARED or MQOO_INPUT_EXCLUSIVE).

MQOO_INPUT_SHARED

Open queue to get messages with shared access.

The queue is opened for use with subsequent MQGET calls. The call can succeed if the queue is currently open by this or another application with MQOO_INPUT_SHARED, but fails with reason code MQRC_OBJECT_IN_USE if the queue is currently open with MQOO_INPUT_EXCLUSIVE.

To determine the value of this attribute, use the MQIA_DEF_INPUT_OPEN_OPTION selector with the MQINQ call.

DistLists (MQLONG)

Distribution list support.

This indicates whether distribution-list messages can be placed on the queue. The attribute is set by a message channel agent (MCA) to inform the local queue manager whether the queue manager at the other end of the channel supports distribution lists. This latter queue manager (called the "partnering queue manager") is the one which next receives the message, after it has been removed from the local transmission queue by a sending MCA.

The attribute is set by the sending MCA whenever it establishes a connection to the receiving MCA on the partnering queue manager. In this way, the sending MCA can cause the local queue manager to place on the transmission queue only messages which the partnering queue manager is capable of processing correctly.

This attribute is primarily for use with transmission queues, but the processing described is performed regardless of the usage defined for the queue (see the Usage attribute).

The value is one of the following:

MQDL_SUPPORTED

Distribution lists supported.

This indicates that distribution-list messages can be stored on the queue, and transmitted to the partnering queue manager in that form. This reduces the amount of processing required to send the message to multiple destinations.

MQDL_NOT_SUPPORTED

Distribution lists not supported.

This indicates that distribution-list messages cannot be stored on the queue, because the partnering queue manager does not support distribution lists. If an application puts a distribution-list message, and that message is to be placed on this queue, the queue manager splits the distribution-list message and places the individual messages on the queue instead. This increases the amount of processing required to send the message to multiple destinations, but ensures that the messages will be processed correctly by the partnering queue manager.

To determine the value of this attribute, use the MQIA_DIST_LISTS selector with the MQINQ call. To change the value of this attribute, use the MQSET call.

This attribute is supported in the following environments: AIX, DOS client, HP-UX, OS/2, OS/400, Sun Solaris, Windows client, Windows NT.

HardenGetBackout (MQLONG)

Whether to maintain an accurate backout count.

For each message, a count is kept of the number of times that the message is retrieved by an MQGET call within a unit of work, and that unit of work subsequently backed out. This count is available in the BackoutCount field in the message descriptor after the MQGET call has completed.

The message backout count survives restarts of the queue manager. However, to ensure that the count is accurate, information has to be "hardened" (recorded on disk or other permanent storage device) each time a message is retrieved by an MQGET call within a unit of work for this queue. If this is not done, and a failure of the queue manager occurs together with backout of the MQGET call, the count may or may not be incremented.

Hardening information for each MQGET call within a unit of work, however, imposes a performance overhead, and the HardenGetBackout attribute should be set to MQQA_BACKOUT_HARDENED only if it is essential that the count is accurate.

On OpenVMS, OS/2, OS/400, Tandem NSK, UNIX systems, and Windows NT, the message backout count is always hardened, regardless of the setting of this attribute.

The following values are possible:

MQQA_BACKOUT_HARDENED

Backout count remembered.

Hardening is used to ensure that the backout count for messages on this queue is accurate.

MQQA_BACKOUT_NOT_HARDENED

Backout count may not be remembered.

Hardening is not used to ensure that the backout count for messages on this queue is accurate. The count may therefore be lower than it should be.

To determine the value of this attribute, use the MQIA_HARDEN_GET_BACKOUT selector with the MQINQ call.

IndexType (MQLONG)

Index type.

This specifies the type of index that the queue manager maintains in order to speed MQGET operations on the queue. No single value is optimal for all queues—it depends on how the messages on the queue are retrieved by the application.

The value is one of the following:

MQIT_NONE

No index.

No index is maintained by the queue manager for this queue. This is the value that should be used for queues which are usually processed sequentially, that is, without using any selection criteria on the MQGET call.

MQIT_MSG_ID

Queue is indexed using message identifiers.

The queue manager maintains an index that uses the message identifiers of the messages on the queue. This is the value that should be used for queues where the application usually retrieves messages using the message identifier as the selection criterion on the MQGET call (that is, the application usually specifies a value other than MQMI_NONE for the MsgId field in the MQMD structure).

MQIT_CORREL_ID

Queue is indexed using correlation identifiers.

The queue manager maintains an index that uses the correlation identifiers of the messages on the queue. This is the value that should be used for queues where the application usually retrieves messages using the correlation identifier as the selection criterion on the MQGET call (that is, the application usually specifies a value other than MQCI_NONE for the CorrelId field in the MQMD structure).

Applications can retrieve messages from the queue regardless of the value of this attribute; its purpose is merely to improve performance in those situations where the application processes the queue in one of the ways described above.

To determine the value of this attribute, use the MQIA_INDEX_TYPE selector with the MQINQ call.

This attribute is supported only on MVS/ESA. On other platforms retrieval optimization may be provided, but it is not controlled by an attribute.

InitiationQName (MQCHAR48)

Name of initiation queue.

This is the name of a queue defined on the local queue manager; the queue must be of type MQQT_LOCAL. The queue manager sends a trigger message to the initiation queue when application start-up is required as a result of a message arriving on the queue to which this attribute belongs. The initiation queue must be monitored by a trigger monitor application which will start the appropriate application after receipt of the trigger message.

To determine the value of this attribute, use the MQCA_INITIATION_Q_NAME selector with the MQINQ call. The length of this attribute is given by MQ_Q_NAME_LENGTH.

This attribute is not supported in the following environments: 16-bit Windows, 32-bit Windows.

MaxMsgLength (MQLONG)

Maximum message length in bytes.

This is the maximum length of the application message data that can exist in each message on the queue. The MaxMsgLength local-queue attribute can be set independently of the MaxMsgLength queue-manager attribute, and the longest physical message that can be placed on a queue is the lesser of those two values. An attempt to place on the queue a message that is too long fails with reason code:

MQRC_MSG_TOO_BIG_FOR_Q if the message to too big for the queue

MQRC_MSG_TOO_BIG_FOR_Q_MGR if the message to too big for the queue manager, but not too big for the queue The value of this attribute is greater than or equal to zero. The upper limit is determined by the environment:

On AIX, HP-UX, OS/2, Sun Solaris, and Windows NT, the maximum message length is 100 MB (104 857 600 bytes).

On OpenVMS, MVS/ESA, OS/400, Tandem NSK, UNIX systems not listed above, 16-bit Windows, and 32-bit Windows, the maximum message length is 4 MB (4 194 304 bytes).

To determine the value of this attribute, use the MQIA_MAX_MSG_LENGTH selector with the MQINQ call.

MaxQDepth (MQLONG)

Maximum queue depth.

This is the defined upper limit for the number of physical messages that can exist on the queue at any one time. An attempt to put a message on a queue that already contains MaxQDepth messages fails with reason code MQRC_Q_FULL. The value of this attribute is zero or greater. The upper limit is determined by the environment:

On OpenVMS, OS/2, OS/400, Tandem NSK, UNIX systems, and Windows NT, the value cannot exceed 640 000.

MsgDeliverySequence (MQLONG)

Message delivery sequence.

This determines the order in which messages are returned to the application by the MQGET call:

MQMDS_PRIORITY

Messages are returned in priority order.

This means that an MQGET call will return the highest-priority message that satisfies the selection criteria specified on the call. Within each priority level, messages are returned in FIFO order (first in, first out).

MQMDS_FIFO

Messages are returned in FIFO order (first in, first out).

This means that an MQGET call will return the first message that satisfies the selection criteria specified on the call, regardless of priority.

If the relevant attributes are changed while there are messages on the queue, the delivery sequence is as follows:

The order in which messages are returned by the MQGET call is determined by the values of the MsgDeliverySequence and DefPriority attributes in force for the queue at the time the message arrives on the queue:

If MsgDeliverySequence is MQMDS_FIFO when the message arrives, the message is placed on the queue as though its priority were DefPriority.

If MsgDeliverySequence is MQMDS_PRIORITY when the message arrives, the message is placed on the queue at the place appropriate to priority given by the Priority field in the message descriptor.

If the value of the MsgDeliverySequence attribute is subsequently changed while there are messages on the queue, the order of the messages on the queue is not changed. This does not affect the value of the Priority field in the MQMD, which retains the value it had when the message was first put.

This means that if the value of the DefPriority attribute is changed, messages will not necessarily be delivered in FIFO order, even though the MsgDeliverySequence attribute is set to MQMDS_FIFO; those that were placed on the queue at the higher priority are delivered first.

To determine the value of this attribute, use the MQIA_MSG_DELIVERY_SEQUENCE selector with the MQINQ call.

OpenInputCount (MQLONG)

Number of opens for input.

This is the number of handles that are currently valid for removing messages from the queue by means of the MQGET call. It is the total number of such handles known to the local queue manager.

The count includes handles where an alias queue which resolves to this queue was opened for input. The count does not include handles where the queue was opened for action(s) which did not include input (for example, a queue opened only for browse).

The value of this attribute fluctuates as the queue manager operates.

This attribute does not apply to model queues, but it does apply to the dynamically-defined queues created from the model queue definitions using the MQOPEN call.

To determine the value of this attribute, use the M QIA_OP EN_INPUT_COUNT selector with the MQINQ call.

OpenOutputCount (MQLONG)

Number of opens for output.

This is the number of handles that are currently valid for adding messages to the queue by means of the MQPUT call. It is the total number of such handles known to the local queue manager; it does not include opens for output that were performed for this queue at remote queue managers.

The count includes handles where an alias queue which resolves to this queue was opened for output. The count does not include handles where the queue was opened for action(s) which did not include output (for example, a queue opened only for inquire).

The value of this attribute fluctuates as the queue manager operates.

This attribute does not apply to model queues, but it does apply to the dynamically-defined queues created from the model queue definitions using the MQOPEN call.

To determine the value of this attribute, use the MQIA_OPEN_OUTPUT_COUNT selector with the MQINQ call.

ProcessName (MQCHAR48)

Process name.

This is the name of a process object that is defined on the local queue manager. The process object identifies a program that can service the queue.

To determine the value of this attribute, use the MQCA_PROCESS_NAME selector with the MQINQ call. The length of this attribute is given by MQ_PROCESS_NAME_LENGTH.

This attribute is not supported in the following environments: 16-bit Windows, 32-bit Windows.

QDepthHighEvent (MQLONG)

Controls whether Queue Depth High events are generated.

A Queue Depth High event indicates that an application has put a message on a queue, and this has caused the number of messages on the queue to become greater than or equal to the queue depth high threshold (see the QDepthHighLimit attribute).

It is one of the following:

MQEVR_DISABLED

Event reporting disabled.

MQEVR_ENABLED

Event reporting enabled.

To determine the value of this attribute, use the MQIA_Q_DEPTH_HIGH_EVENT selector with the MQINQ call.

On MVS/ESA, the MQINQ call cannot be used to determine the value of this attribute.

QDepthHighLimit (MQLONG)

High limit for queue depth.

The threshold against which the queue depth is compared to generate a Queue Depth High event.

This event indicates that an application has put a message on a queue, and this has caused the number of messages on the queue to become greater than or equal to the queue depth high threshold. See the QDepthHighEvent attribute.

The value is expressed as a percentage of the maximum queue depth (MaxQDepth attribute), and is greater than or equal to 0 and less than or equal to 100. The default value is 80.

To determine the value of this attribute, use the MQIAQ_DEPTH_HIGH_LIMIT selector with the MQINQ call.

On MVS/ESA, the MQINQ call cannot be used to determine the value of this attribute.

This attribute is not supported in the following environments: 16-bit Windows, 32-bit Windows.

QDepthLowEvent (MQLONG)

Controls whether Queue Depth Low events are generated.

A Queue Depth Low event indicates that an application has retrieved a message from a queue, and this has caused the number of messages on the queue to become less than or equal to the queue depth low threshold (see the QDepthLowLimit attribute).

It is one of the following:

MQEVR_DISABLED

Event reporting disabled.

MQEVR_ENABLED

Event reporting enabled.

To determine the value of this attribute, use the MQIA_Q_DEPTH_LOW_EVENT selector with the MQINQ call.

On MVS/ESA, the MQINQ call cannot be used to determine the value of this attribute.

QDepthLowLimit (MQLONG)

Low limit for queue depth.

The threshold against which the queue depth is compared to generate a Queue Depth Low event.

This event indicates that an application has retrieved a message from a queue, and this has caused the number of messages on the queue to become less than or equal to the queue depth low threshold. See the QDepthLowEvent attribute.

The value is expressed as a percentage of the maximum queue depth (MaxQDepth attribute), and is greater than or equal to 0 and less than or equal to 100. The default value is 20.

To determine the value of this attribute, use the MQIA_Q_DEPTH_LOW_LIMIT selector with the MQINQ call.

On MVS/ESA, the MQINQ call cannot be used to determine the value of this attribute.

This attribute is not supported in the following environments: 16-bit Windows, 32-bit Windows.

QDepthMaxEvent (MQLONG)

Controls whether Queue Full events are generated.

A Queue Full event indicates that a put to a queue has been rejected because the queue is full, that is, the queue depth has already reached its maximum value.

It is one of the following:

MQEVR_DISABLED

Event reporting disabled.

MQEVR_ENABLED

Event reporting enabled.

To determine the value of this attribute, use the MQIAQ_DEPTH_MAX_EVENT selector with the MQINQ call.

On MVS/ESA, the MQINQ call cannot be used to determine the value of this attribute.

QServiceInterval (MQLONG)

Target for queue service interval.

The service interval used for comparison to generate Service Interval High and Service Interval OK events. See the QServiceIntervalEvent attribute.

The value is in units of milliseconds, and is greater than or equal to zero, and less than or equal to 999 999 999.

To determine the value of this attribute, use the MQIA_Q_SERVICE_INTERVAL selector with the MQINQ call.

On MVS/ESA, the MQINQ call cannot be used to determine the value of this attribute.

This attribute is not supported in the following environments: 16-bit Windows, 32-bit Windows.

QServiceIntervalEvent (MQLONG)

Controls whether Service Interval High or Service Interval OK events are generated.

A Service Interval High event is generated when a check indicates that no messages have been retrieved from the queue for at least the time indicated by the QServiceInterval attribute.

A Service Interval OK event is generated when a check indicates that messages have been retrieved from the queue within the time indicated by the QServiceInterval attribute.

It is one of the following:

MQQSIE_HIGH

Queue Service Interval High events enabled.
  Queue Service Interval High events are enabled and Queue Service Interval OK events are disabled.

MQQSIE_OK

Queue Service Interval OK events enabled.
  Queue Service Interval High events are disabled and Queue Service Interval OK events are enabled.

MQQSIE_NONE

No queue service interval events enabled.
  Queue Service Interval High events are disabled and Queue Service Interval OK events are also disabled.

To determine the value of this attribute, use the MQIAQ_SERVICE_INTERVAL_EVENT selector with the MQINQ call.

On MVS/ESA, the MQINQ call cannot be used to determine the value of this attribute.

RetentionInterval (MQLONG)

Retention interval.

This is the period of time for which the queue should be retained. After this time has elapsed, the queue is eligible for deletion.

The time is measured in hours, counting from the date and time when the queue was created. The creation date and time of the queue are recorded in the CreationDate and CreationTime attributes, respectively.

This information is provided to enable a housekeeping application or the operator to identify and delete queues that are no longer required.

A realistic retention interval should be used to prevent the accumulation of permanent dynamic queues (see DefinitionType). However, this attribute can also be used with predefined queues.

To determine the value of this attribute, use the MQIA_RETENTION_INTERVAL selector with the MQINQ call.

Shareability (MQLONG)

Queue shareability.

This indicates whether the queue can be opened for input multiple times concurrently. It is one of the following:

MQQA_SHAREABLE

Queue is shareable.
  Multiple opens with the MQOO_INPUT_SHARED option are allowed.

MQQA_NOT_SHAREABLE

Queue is not shareable.
  An MQOPEN call with the MQOO_INPUT_SHARED option is treated as MQOO_INPUT_EXCLUSIVE.

To determine the value of this attribute, use the MQIA_SHAREABILITY selector with the MQINQ call.

StorageClass (MQCHAR8)

Storage class for queue.

This is a user-defined name that defines the physical storage used to hold the queue. In practice, a message is written to disk only if it needs to be paged out of its memory buffer.

To determine the value of this attribute, use the MQCA_STORAGE_CLASS selector with the MQINQ call. The length of this attribute is given by MQ_STORAGE_CLASS_LENGTH.

This attribute is supported only on MVS/ESA.

TriggerControl (MQLONG)

Trigger control.

This controls whether trigger messages are written to an initiation queue, in order to cause an application to be started to service the queue.

This is one of the following:

MQTC_OFF

Trigger messages not required.

No trigger messages are to be written for this queue. The value of TriggerType is irrelevant in this case.

MQTC_ON

Trigger messages required.

Trigger messages are to be written for this queue, when the appropriate trigger events occur.

To determine the value of this attribute, use the MQI-A_TRIGGER_CONTROL selector with the MQINQ call. To change the value of this attribute, use the MQSET call.

This attribute is not supported in the following environments: 16-bit Windows, 32-bit Windows.

TriggerData (MQCHAR64)

Trigger data.

This is free-format data that the queue manager inserts into the trigger message when a message arriving on this queue causes a trigger message to be written to the initiation queue.

The content of this data is of no significance to the queue manager. It is meaningful either to the trigger-monitor application which processes the initiation queue, or to the application which is started by the trigger monitor.

The character string cannot contain any nulls. It is padded to the right with blanks if necessary.

To determine the value of this attribute, use the MQC-A_TRIGGER_DATA selector with the MQINQ call. To change the value of this attribute, use the MQSET call. The length of this attribute is given by MQ_TRIGGER_DATA_LENGTH.

This attribute is not supported in the following environments: 16-bit Windows, 32-bit Windows.

TriggerDepth (MQLONG)

Trigger depth.

This is the number of messages that have to be on the queue before a trigger message is written when TriggerType is set to MQTT_DEPTH. The value of TriggerDepth is one or greater. This attribute is not used otherwise.

To determine the value of this attribute, use the MQI-A_TRIGGER_DEPTH selector with the MQINQ call. To change the value of this attribute, use the MQSET call.

This attribute is not supported in the following environments: 16-bit Windows, 32-bit Windows.

TriggerMsgPriority (MQLONG)

Threshold message priority for triggers.

This is the message priority below which messages do not contribute to the generation of trigger messages (that is, the queue manager ignores these messages when deciding whether a trigger message should be generated). TriggerMsgPriority can be in the range zero (lowest) through MaxPriority (highest).

To determine the value of this attribute, use the MQI-A_TRIGGER_MSG_PRIORITY selector with the MQINQ call. To change the value of this attribute, use the MQSET call.

This attribute is not supported in the following environments: 16-bit Windows, 32-bit Windows.

TriggerType (MQLONG)

Trigger type.

This controls the conditions under which trigger messages are written as a result of messages arriving on this queue.

It is one of the following:

MQTT_NONE

No trigger messages.

No trigger messages are written as a result of messages on this queue. This has the same effect as setting TriggerControl to MQTC_OFF.

MQTT_FIRST

Trigger message when queue depth goes from 0 to 1.

A trigger message is written whenever the queue changes from empty (no messages on the queue) to not-empty (one or more messages on the queue).

MQTT_EVERY

Trigger message for every message.

A trigger message is written every time a message arrives on the queue.

MQTT_DEPTH

Trigger message when depth threshold exceeded.

A trigger message is written when a certain number of messages (TriggerDepth) are on the queue. After the trigger message has been written, TriggerControl is set to MQTC_OFF to prevent further triggering until it is explicitly turned on again.

To determine the value of this attribute, use the MQI-A_TRIGGER_TYPE selector with the MQINQ call. To change the value of this attribute, use the MQSET call.

This attribute is not supported in the following environments: 16-bit Windows, 32-bit Windows.

Usage (MQLONG)

Queue usage.

This indicates what the queue is used for. It is one of the following:

MQUS_NORMAL

Normal usage.

This is a queue that normal applications use when putting and getting messages; the queue is not a transmission queue.

MQUS_TRANSMISSION

Transmission queue.

This is a queue used to hold messages destined for remote queue managers. When a normal application sends a message to a remote queue, the local queue manager stores the message temporarily on the appropriate transmission queue in a special format. A message channel agent then reads the message from the transmission queue, and transports the message to the remote queue manager.

Only privileged applications can open a transmission queue for MQOO_OUTPUT to put messages on it directly. Only utility applications would normally be expected to do this. Care must be taken that the message data format is correct, otherwise errors may occur during the transmission process. Context is not passed or set unless one of the MQPMO_*_CONTEXT context options is specified.

To determine the value of this attribute, use the MQIA_USAGE selector with the MQINQ call.

Similarly, a number of attributes are unique to remote queues. These attributes are set forth below.

RemoteQMgrName (MQCHAR48)

Name of remote queue manager.

The name of the remote queue manager on which the queue RemoteQName is defined.

If an application opens the local definition of a remote queue, RemoteQMgrName must not be blank and must not be the name of the local queue manager. If XmitQName is blank, the local queue whose name is the same as RemoteQMgrName is used as the transmission queue. If there is no queue with the name RemoteQMgrName, the queue identified by the DefXmitQName queue-manager attribute is used. If this definition is used for a queue-manager alias, RemoteQMgrName is the name of the queue manager that is being aliased. It can be the name of the local queue manager. Otherwise, if XmitQName is blank when the open occurs, there must be a local queue whose name is the same as RemoteQMgrName; this queue is used as the transmission queue.

If this definition is used for a reply-to alias, this name is the name of the queue manager which is to be the ReplyToQMgr.

To determine the value of this attribute, use the MQCA_REMOTEQ_MGR_NAME selector with the MQINQ call.

The length of this attribute is given by MQ_Q_MGR_NAME_LENGTH.

RemoteQName (MQCHAR48)

Name of remote queue.

The name of the queue as it is known on the remote queue manager RemoteQMgrName.

If an application opens the local definition of a remote queue, when the open occurs RemoteQName must not be blank.

If this definition is used for a queue-manager alias definition, when the open occurs RemoteQName must be blank.

If the definition is used for a reply-to alias, this name is the name of the queue that is to be the ReplyToQ.

To determine the value of this attribute, use the MQCA_REMOTE_Q_NAME selector with the MQINQ call.

The length of this attribute is given by MQ_Q_NAME_LENGTH.

XmitQName (MQCHAR48)

Transmission queue name.

If this attribute is nonblank when an open occurs, either for a remote queue or for a queue-manager alias definition, it specifies the name of the local transmission queue to be used for forwarding the message.

If XmitQName is blank, the local queue whose name is the same as RemoteQMgrName is used as the transmission queue. If there is no queue with the name RemoteQMgrName, the queue identified by the DefXmitQName queue-manager attribute is used.

This attribute is ignored if the definition is being used as a queue-manager alias and RemoteQMgrName is the name of the local queue manager.

It is also ignored if the definition is used as a reply-to queue alias definition.

To determine the value of this attribute, use the MQCA_XMIT_Q_NAME selector with the MQINQ call.

The length of this attribute is given by MQ_Q_NAME_LENGTH.

Finally, the following attribute is uniquely associated with alias queues.

BaseQName (MQCHAR48)

The queue name to which the alias resolves.

This is the name of a queue that is defined to the local queue manager. The queue is one of the following types:

MQQT_LOCAL

Local queue.

MQQT_REMOTE

Local definition of a remote queue.

To determine the value of this attribute, use the MQCA_BASE_Q_NAME selector with the MQINQ call.

The length of this attribute is given by MQ_Q_NAME_LENGTH.

In selecting those attributes to be monitored for the selected queues, it is contemplated that various attributes may be selected and that the various attributes may include attributes common to all types of queues or unique to specific types of queues. In the disclosed embodiment of the invention, however, a pair of attributes common to all queues, specifically, the InhibitGet (hereafter referred to as "Get") and InhibitPut (hereafter referred to as "Put") attributes, and a pair of attributes unique to local initiation queues, specifically, the CurrentDepth (hereafter referred to as "Depth") and TriggerControl (hereafter referred to as "Trigger") attributes are selected for monitoring.

Continuing on to step 208, a network monitoring table 250 is constructed from the selected queues and selected attributes. The constructed network monitoring table 250 may be seen by reference to FIG. 4. As may now be seen, the constructed network monitoring table 250 is comprised of two portions—a persistent portion 252 and a dynamic portion 254. The persistent portion 252 of the constructed network monitoring table 250 is comprised of the queues selected for monitoring at step 204 and the attributes selected for monitoring at step 206. The dynamic portion 254 is comprised of the values for those attributes which will be later acquired in the manner set forth below. In this regard, it should be noted that, because all of the selected queues are local initiation queues and all of the attributes are either common for all types of queues or unique to local queues, each of the selected attributes will have a value for each queue. This may not necessarily be the result, however, depending on the particular queues and attributes selected for inclusion in the network monitoring table 250.

Figure 4:
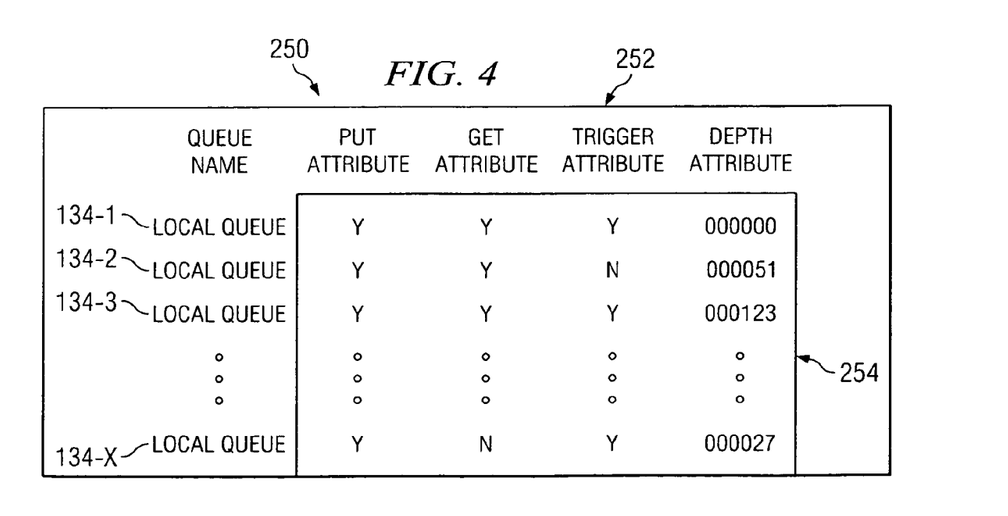
FIG. 4 illustrates a display used to monitor a queue-based messaging system at the network level.

As may be further seen in FIG. 4, the network monitoring table 250 is configured such that the values for the Put, Get, Trigger and Depth attributes are listed for each one of a plurality of queues. The number of queues for which the values for these attributes may be listed as part of the network monitoring table may vary depending on a number of considerations such as the number of client process applications exchanging messages with the server process application and the number of rows (each containing the attribute values for a single queue) which can be physically accommodated on the monitor on which the network monitoring table 250 is displayed. In one embodiment, the network monitoring table 250 is configured to list the values of the selected attributes for five queues. In another, the network monitoring table 250 is configured to list the values of the selected attributes for fourteen queues. In another, the network monitoring table 250 is configured to list the values of the selected attributes for fifteen queues. In still another, the network monitoring table 250 is configured to list the values of the selected attributes for seventeen queues. Generally, for monitors forming part of the user interface 122 for a mainframe cannot accommodate more than seventeen queues on the monitor. Accordingly, if the values of the selected attributes are to be displayed for more than seventeen queues, the network monitoring table 250 may be configured such that the network administrator may scroll down to view the additional queues or may be configured such that the network administrator can pull down a second page to view the additional queues.

Proceeding on to step 210, the messaging API 138 issues one or more MQINQ calls to the queue manager 126 to acquire the current values of the selected attributes for the selected queues. In turn, the queue manager 126 retrieves the requested information from the messaging application database 140 and returns the information to the messaging API 138. Continuing on to step 212, construction of the network monitoring table 250 is completed by placing the returned information into the dynamic portion 254 thereof. The network monitoring table 250 is then displayed for review by the network administrator, for example, on a monitor of the user interface 122. Preferably, when the network monitoring table 250 is displayed for review by the network administrator on a monitor of the user interface 122, the current values of the selected attributes for the selected queues are displayed generally simultaneously on the monitor. By doing so, the ability of the network administrator to efficiently identify messaging failures in the queue-based messaging system is enhanced.

At step 214, the network administrator may analyze the network monitoring table 250 to identify messaging failures in the queue-based messaging system. More specifically, messaging failures may identified for messages exchanged between a selected client computer platform and the server computer platform 102 by examining the selected attributes for the local initiation queue corresponding to the selected client computer platform. For example, messaging failures between the server computer platform 102 and the client computer platform 108-2 may be identified by examining the current values for the selected attributes for the local queue 134-2.

As previously set forth, in the embodiment of the invention disclosed herein, current values for the Put, Get, Trigger and Depth attributes are displayed for the selected queues. As previously set forth in greater detail, the Put attribute indicates whether the selected local queue, for example, the local queue 134-2, is enabled (yes) or disabled (no) for put operations. If enabled, the queue manager 126 is able to place messages, typically messages originating at the client process application 108-2, in the local queue 134-2. If disabled, the queue manager 126 cannot place messages from the client process application 108-2 in the local queue 134-2. The Get attribute indicates whether the local queue 134-2 is enabled (yes) or disabled (no) for get operations. If enabled, the queue manager 126 is able to retrieve messages from the local queue 134-2, typically, for delivery to the server process application 106. If disabled, the queue manager 126 is unable to retrieve messages from the local queue 134-2 for delivery to the server process application 106. The Trigger attribute indicates whether queue manager 126 delivers a trigger signal to the process upon placing a message in the local queue 134-2. If enabled, the queue manager 126 will deliver a trigger signal to the server process application 106 upon placing a message in the local queue 134-2 if certain conditions in the local queue 134-2 are met. If disabled, the queue manager 126 will not deliver a trigger signal to the server process application 106 upon placing a message in the local queue 134-2, even if those conditions in the local queue 134-2 are met. Typically, the queue conditions which affect delivery of the trigger signal is that if there are no messages sitting in the local queue 134-2 when a new message is placed in the local queue 134-2, a trigger signal is delivered to the server process application 106. Conversely, the trigger signal is not delivered if there are messages sitting in the local queue 134-2 when the new message is placed in the local queue 134-2. Finally, the depth attribute indicates the number of messages sitting in the local queue 134-2.

Rather than having the network administrator analyze the network monitoring table 250 to identify messaging failures for the queue-based messaging system, in one embodiment of the invention, it is contemplated that analytical functionality similar to that performed by the network administrator in step 214 may instead be incorporated into the monitoring tool 120. For example, the put attribute being disabled, the get attribute being disabled, the trigger attribute being disabled and/or the depth attribute having a value greater than zero are all considered to be indicative of a potential messaging failure in the corresponding queue. Accordingly, after the monitoring tool 120 acquires the values of these attributes from the messaging application, rather than merely displaying the acquired values as part of the network monitoring table 250, the monitoring tool 120 may be constructed to include logic by which, if the acquired values are deemed to be indicative of a potential messaging failure, when displayed as part of the network monitoring table 250, all such values will be highlighted to draw attention to the potential messaging failures.

In various embodiments of the invention, various combinations of the selected attributes may be reviewed to determine messaging failures for a selected queue of the queue-based messaging system. In one embodiment, the Depth attribute alone may be used to identify messaging failures for a selected queue of the queue-based messaging system. In another, the Depth attribute in combination with the Trigger attribute may be used to identify messaging failures for a selected queue of the queue-based messaging system. In still other embodiments, the Depth attribute in combination with one or more of the Put, Get and Trigger attributes may be used to identify messaging failures for a selected queue of the queue-based messaging system. Finally, in the disclosed embodiment of the invention, the Put, Get, Trigger and Depth attributes are used in combination to identify messaging failures for a selected queue of the queue-based messaging system.

For example, a review of the network monitoring table 250 illustrated in FIG. 4 indicates that the local queue 134-1 is operating normally, messaging failures have occurred in the local queues 134-2 and 134-X and a probable messaging failure has occurred in the local queue 134-3. More specifically, the local queue 134-1 is clearly operating normally because the Put, Get and Trigger attributes are all enabled and there are no messages sitting in the local queue 134-1. In reviewing the local queue 134-2, the value of the Depth attribute indicates that 51 messages are sitting in the local queue 134-2. This, in itself, strongly suggests a messaging failure. However, the Trigger attribute for the local queue 134-2 is disabled. As a result, the client process application 106 has never been notified that there are messages waiting in the local queue 134-2. Accordingly, a messaging failure has clearly occurred. In reviewing the local queue 134-X, the value of the Depth attribute indicates that 27 messages are sitting in the local queue 134-X. Again, this, in itself, strongly suggests a messaging failure. However, the Get attribute for the local queue 134-2 is disabled. As a result, the client process application 106 is unable to retrieve messages from the local queue 134-2. Again, a messaging failure has clearly occurred.

Continuing on to step 216, the network administrator initiates corrective action to rectify messaging failures identified while reviewing the network monitoring table 250. For example, if messages are backed up in a queue, for example, in the local queue 134-2, the network administrator may decide to issue a trigger message to the server process application 106 using the messaging API 138. For example, in the MQ Series messaging software, the messaging API 138 may be used to issue a MQSET call to the queue manager 126 to re-set the TriggerControl attribute of the local queue 134-2. More specifically, by changing the status of the TriggerControl attribute to MQTC_ON (i.e., enabling the Trigger attribute) or changing the value of either the TriggerType, TriggerMsgPriority or TriggerDepth attributes under certain conditions when the TriggerControl attribute is already set to MQTC_ON, a trigger message is sent to the process application 106. By sending a trigger message to the process application 106, the process application 106 will begin removing the messages backed up in the local queue 134-2.

At step 218, the network administrator may either refresh the network monitoring table 250, thereby returning the method to step 210 or proceed to step 220, thereby ending the monitoring of the queue-based messaging system. Typically, the network administrator will decide to refresh the network monitoring table 250 if the data acquired during generation of the current network monitoring table 250 is inconclusive as to whether a messaging failure has occurred in one or more of the selected queues. For example, in the network monitoring table 250, the presence of 123 messages in the local queue 124-3 was considered to be strongly indicative of a messaging failure. However, the Put, Get and Trigger attributes are all enabled. Accordingly, it is possible that, rather than having been subject to a messaging failure, the local queue 124-3 may merely be experiencing an unusually high volume messages. Under these circumstances, the network administrator would refresh the network monitoring table 250. Accordingly, an inquiry to the queue manager 126 to obtain new values for the selected attributes for the selected queues would again be issued at step 210 and a refreshed display containing the new values for the selected attributes would be generated at step 212. When the refreshed display is reviewed at step 214, the previously inconclusive condition of the local queue 134-3 may be re-determined. For example, if the refreshed value of the depth attribute indicates that number of messages backed up in the local queue 134-3 continues to climb, a messaging failure has clearly occurred and appropriate corrective action should be initiated at step 216. Conversely, if the refreshed value of the depth attribute indicates that the number of messages backed up in the local queues is steady or declining, it is highly unlikely that a messaging failure has occurred and no corrective action would be needed at step 216.

Returning momentarily to FIG. 1, it is contemplated that the monitoring tool 120 may contain program code which includes a first set of instructions to enable the network administrator to interact exclusively with the monitoring tool 120, for example, in an interactive dialogue, to perform the steps set forth in the method of FIG. 3 to select the queues to be monitored, to select the attributes of the selected queues for which the current values are to be acquired and to initiate any appropriate corrective action. It is further contemplated that the monitoring tool 120 may contain additional program code which includes a second set of instructions to enable the monitoring tool 120 to instruct the messaging APT 138 of the messaging application 118 to retrieve the selected attributed values for the monitoring tool 120 and/or initiate any selected corrective action. Finally, it is still further contemplated that the monitoring tool 120 may contain further additional program code which includes a third set of instructions to enable the monitoring tool 120 to construct the network monitoring table 250 from the list of queues and attributes selected by the network administrator and the values of the selected attributes provided by the messaging API 138 and to generate a display of the network monitoring table 250 at the user interface 122. Of course, it should be understood that the network administrator could access the messaging API 138 through the user interface 122 to perform a number of these operations. However, a number of advantages are derived by having the monitoring tool 120 access the messaging API 138 on the network administrator's behalf. For example, the network administrator is protected from inadvertently modifying the queues and/or their attributes when acquiring the current values of selected attributes. Furthermore, the queue-based messaging system can be monitored without the network administrator having detailed knowledge of the messaging API 138 itself.

Thus, there has been described and illustrated herein, a method and apparatus for network-level monitoring of queue-based messaging systems used to exchange messages between disparate computer platforms of a distributed computing environment. However, those skilled in the art should recognize that numerous modifications and variations may be made in the techniques disclosed herein without departing substantially from the spirit and scope of the invention. Accordingly, the scope of the invention should only be defined by the claims appended hereto.

The invention claimed is:

1. A distributed computing environment, comprising:
   (a) a server computer platform on which a server process application resides;
   (b) a plurality of client computer platforms coupled to said server computer platform, each one of said plurality of client computer platforms having a client process application residing thereon;
   (c) a queue-based messaging system for controlling the exchange of messages between said server process application and said plurality of client process applications, said queue-based messaging system comprising a messaging application residing at each one of said server computer platform and said plurality of client computer platforms, said messaging application residing at said server computer platform managing a plurality of queues, each one of said plurality of queues described by a plurality of attributes; and
   (d) a system for monitoring said queue-based messaging system, said monitoring system allowing a user to select at least two of said plurality of queues and four attributes selected from a group consisting of put, get, trigger and depth attributes, describing one or more of said plurality of queues and generating a display which simultaneously includes a current value for said selected attributes for each one of said selected queues described thereby.

2. The distributed computing environment of claim 1, wherein each one of said plurality of queues is a local queue for receiving messages originating at a corresponding one of said plurality of client process applications and destined for said server process application.

3. The distributed computing environment of claim 2, wherein a first one of said plurality of selected attributes is common to all queues and a second one of said plurality of selected attributes is unique to local queues.

4. The distributed computing environment of claim 3, wherein said second one of said plurality of selected attributes is a depth attribute.

5. The distributed computing environment of claim 3, wherein said first one of said selected attributes is a get attribute and said second one of said selected attributes is a depth attribute.

6. The distributed computing environment of claim 2, wherein first and second ones of said plurality of selected attributes are unique to local queues.

7. The distributed computing environment of claim 6, wherein said first one of said selected attributes is a trigger attribute and said second one of said selected attributes is a depth attribute.

8. The distributed computing environment of claim 7, wherein a third one of said plurality of selected attributes is common to all queues.

9. The distributed computing environment of claim 8, wherein said third one of said plurality of selected attributes is a get attribute.

10. A distributed computing environment, comprising:
   a) a server computer platform on which a server process resides; and
   b) at least five client computer platforms coupled to said server computer platform, each one of said plurality of client computer platforms having a client process application residing thereon;
   c) a queue-based messaging system for controlling the exchange of messages between said server process application and said at least five client process applications, said queue-based messaging system comprising a messaging application residing at each one of said server computer platform and said at least five client computer platforms, said messaging application residing at said server computer platform managing at least five trigger-initiated local queues having a queue depth attribute, each one of said at least five trigger-initiated local queues associated with a corresponding one of said at least five client process applications;
   d) a monitoring tool residing on said server computer platform, said monitoring tool acquiring a value for said queue depth attribute for each one of said at least five trigger-initiated local queues;
   e) a user interface coupled to said server computer platform, said monitoring tool generally simultaneously displaying, on said user interface, said value for said queue depth attribute for each one of said at least five trigger-initiated local queues;
   f) each one of said at least five trigger-initiated local queues has a trigger enable attribute, a get message enable attribute and a put message enable attribute;
   g) said monitoring tool acquires a value for said trigger enable attribute, said get message enable attribute and said put message enable attribute for each one of said at least five trigger-initiated local queues; and
   h) said monitoring tool generally simultaneously displaying, on said user interface, said value for said queue depth attribute, said value for said trigger enable attribute, said value for said get message enable attribute and said value for said put message enable attribute for each one of said at least five trigger-initiated local queues.

11. The distributed computing environment of claim 10, wherein:
   a) each one of said at least five trigger-initiated local queues has a trigger enable attribute;
   b) said monitoring tool acquires a value for said trigger enable attribute for each one of said at least five trigger-initiated local queues; and
   c) said monitoring tool generally simultaneously displaying, on said user interface, said value for said queue depth attribute and said value for said trigger enable attribute for each one of said at least five trigger-initiated local queues.

12. The distributed computing environment of claim 10, wherein:
   a) each one of said at least five trigger-initiated local queues has a get message enable attribute;
   b) said monitoring tool acquires a value for said get enable attribute for each one of said at least five trigger-initiated local queues; and
   c) said monitoring tool generally simultaneously displaying, on said user interface, said value for said queue depth attribute and said value for said get message enable attribute for each one of said at least five trigger-initiated local queues.

13. The distributed computing environment of claim 10, wherein:
   a) each one of said at least five trigger-initiated local queues has a put message enable attribute;
   b) said monitoring tool acquires a value for said put message enable attribute for each one of said at least five trigger-initiated local queues; and
   c) said monitoring tool generally simultaneously displaying, on said user interface, said value for said queue depth attribute and said value for said put message enable attribute for each one of said at least five trigger-initiated local queues.

14. For a network having a server computer platform and a plurality of client computer platforms coupled to said server platform, a method for monitoring a queue-based messaging system which control the transfer of messages from said plurality of client computer platform to a corresponding plurality of queues residing at said server computer platform, comprising:
   (a) selecting at least three attributes including at least one depth attribute and at least two operations control attributes, which describe each one of said plurality of queues;
   (b) acquiring, from said server computer platform, a value for each one of said at least three attributes; and
   (c) generally simultaneously displaying said value for each one of said at least three attributes for all of said plurality of queues.

15. The method of claim 14, and further comprising:
   g) reviewing said display of said value for each one of said at least one attribute for all of said plurality of queues; and
   h) initiating corrective action to rectify messaging failures identified from said review of said display.

16. The method of claim 15, and further comprising:
   i) refreshing said display of said value for each one of said at least one attribute for all of said plurality of queues; and
   j) initiating corrective action to rectify messaging failures identified from a comparison of said refreshed display to said display.

17. The method of claim 14, wherein the operations control attributes are selected from a group consisting of put attribute, get attribute, and trigger attribute.

18. The method of claim 14, wherein the action of selecting at least one operations control attributes comprises selecting at least two operations control attributes selected from a group consisting of put attribute, get attribute, and trigger attribute.

19. The method of claim 14, wherein the action of selecting at least one operations control attributes comprises selecting at least three operations control attributes selected from a group consisting of put attribute, get attribute, and trigger attribute.

* * * * *